United States Patent
Hsu et al.

(10) Patent No.: US 12,441,185 B2
(45) Date of Patent: Oct. 14, 2025

(54) DISPLAY DEVICE

(71) Applicant: AUO Corporation, Hsin-Chu (TW)

(72) Inventors: Chiu-Lan Hsu, Hsin-Chu (TW);
Chi-Chen Huang, Hsin-Chu (TW);
Jien-Feng Huang, Hsin-Chu (TW);
Ren-Mei Tseng, Hsin-Chu (TW);
Wu-Chang Tsai, Hsin-Chu (TW);
Tzu-Chiang Cheng, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 186 days.

(21) Appl. No.: 18/393,746

(22) Filed: Dec. 22, 2023

(65) Prior Publication Data

US 2025/0001862 A1    Jan. 2, 2025

(30) Foreign Application Priority Data

Jun. 27, 2023   (TW) ................................. 112123957

(51) Int. Cl.
*B60K 35/22*     (2024.01)

(52) U.S. Cl.
CPC ........ *B60K 35/22* (2024.01); *B60K 2360/691* (2024.01)

(58) Field of Classification Search
CPC ........ B60K 2360/652; B60K 2360/691; B60K 35/22
See application file for complete search history.

(56) References Cited

U.S. PATENT DOCUMENTS

| | | | |
|---|---|---|---|
| 9,888,593 | B2 * | 2/2018 | Huang .................. G02F 1/1333 |
| 11,219,133 | B2 * | 1/2022 | Kuo .................. G02F 1/133331 |
| 11,528,987 | B1 * | 12/2022 | Girault .................... A45F 5/102 |
| 11,972,705 | B1 * | 4/2024 | Robert .................. G06F 1/1601 |
| 2001/0054828 | A1 * | 12/2001 | Koepff .................... B60R 11/02 |
| | | | 296/24.34 |
| 2003/0168875 | A1 * | 9/2003 | Anderson ................. B60R 7/04 |
| | | | 296/37.8 |
| 2005/0001105 | A1 * | 1/2005 | Matsuda ................ B60K 35/10 |
| | | | 248/27.1 |
| 2005/0067536 | A1 * | 3/2005 | Slatosch ............. B60R 11/0235 |
| | | | 248/27.1 |
| 2005/0285990 | A1 * | 12/2005 | Havelka ............... G04G 9/0041 |
| | | | 349/58 |

(Continued)

FOREIGN PATENT DOCUMENTS

CN     203601202 U     5/2014
CN     210191626 U     3/2020

*Primary Examiner* — Peter D Le
(74) *Attorney, Agent, or Firm* — WPAT, PC

(57) ABSTRACT

A display device includes a housing. The housing includes a main body, a first fixed end, a second fixed end, a third fixed end, a fourth fixed end, and an opening area. The opening area is disposed at a lower half portion of the main body. The opening area has a first opening, a second opening, and a third opening. The first opening has an axis extending along a first direction substantially perpendicular to a bottom side of the main body. The second opening is disposed on a first side of the first opening and has an axis extending along a second direction having a first angle with respect to the first direction. The third opening is disposed on a second side of the first opening opposite to the first side and has an axis along a third direction having a second angle with respect to the first direction.

20 Claims, 16 Drawing Sheets

(56) References Cited

U.S. PATENT DOCUMENTS

| | | | |
|---|---|---|---|
| 2006/0066124 A1* | 3/2006 | Schmidt | B60K 35/50 296/70 |
| 2008/0077882 A1* | 3/2008 | Kramer | G01C 21/3664 715/810 |
| 2008/0100117 A1* | 5/2008 | Liu | B60N 2/879 297/397 |
| 2009/0091163 A1* | 4/2009 | Liu | G01C 21/36 297/217.3 |
| 2009/0122473 A1* | 5/2009 | Lee | H05K 5/02 361/679.01 |
| 2010/0103598 A1* | 4/2010 | Sakata | G01C 21/36 361/679.01 |
| 2010/0165219 A1* | 7/2010 | Ikunami | G06F 1/1656 348/836 |
| 2012/0145861 A1* | 6/2012 | Collins | F16M 13/025 248/274.1 |
| 2013/0120938 A1* | 5/2013 | Lang | H05K 7/20963 361/679.01 |
| 2013/0331159 A1* | 12/2013 | Ito | A63F 9/24 463/6 |
| 2014/0111454 A1* | 4/2014 | Hosoi | G06F 3/04883 345/173 |
| 2014/0153168 A1* | 6/2014 | Hida | B60K 35/60 361/679.01 |
| 2014/0252837 A1* | 9/2014 | Yamaguchi | B60N 2/4228 403/2 |
| 2016/0345045 A1* | 11/2016 | Liu | G06F 1/1633 |
| 2023/0202300 A1* | 6/2023 | Badar | B60K 37/00 348/837 |
| 2024/0244769 A1* | 7/2024 | Wang | H05K 5/02 |

\* cited by examiner

DISPLAY DEVICE

CROSS-REFERENCE TO RELATED APPLICATION

This application claims priority to Taiwan Application Ser. No. 112123957, filed Jun. 27, 2023, which is herein incorporated by reference.

BACKGROUND

Field of Invention

The present disclosure relates to a display device, and more particularly, to an automotive display device.

Description of Related Art

In recent years, electronic devices such as display devices have been integrated into automobiles. However, for safety concerns, some regulations require vehicle-mounted display devices pass, for example, a head impact test (HIT), to reduce the impact on passengers in a car accident. Therefore, the head impact protection of automotive display devices has been brought into focus.

Accordingly, how to provide a display device to solve the aforementioned problems becomes an important issue to be solved by those in the industry.

SUMMARY

An aspect of the disclosure is to provide a display device that may efficiently solve the aforementioned problems.

According to some embodiments of the disclosure, a display device includes a housing. The housing has a first surface adjacent to a display panel. The housing includes a main body, a first fixed end, a second fixed end, a third fixed end, and a fourth fixed end. The first surface has a center point and a bottom side. The center point and the bottom side define a lower half portion of the main body. The first fixed end, the second fixed end, the third fixed end, and the fourth fixed end are disposed in the lower half portion. The housing further includes an opening area. The opening area is disposed in the lower half portion. The opening area has at least one first opening, at least one second opening, and at least one third opening. The at least one first opening has an axis extending along a first direction substantially perpendicular to the bottom side. The at least one second opening is disposed on a first side of the at least one first opening and has an axis extending along a second direction having a first angle with respect to the first direction. The at least one third opening is disposed on a second side of the at least one first opening opposite to the first side and has an axis extending along a third direction having a second angle with respect to the first direction. The first fixed end and the third fixed end are disposed on the first side. The second fixed end and the fourth fixed end are disposed on the second side.

According to some other embodiments of the disclosure, a display device includes a housing. The housing has a first surface adjacent to a display panel. The housing includes a main body, a first fixed end, a second fixed end, a third fixed end, and a fourth fixed end. The first surface has a center point and a bottom side. The center point and the bottom side define a lower half portion of the main body. The first fixed end, the second fixed end, the third fixed end, and the fourth fixed end are disposed in the lower half portion. The first fixed end and the third fixed end are disposed on a first side of the center point. The second fixed end and the fourth fixed end are disposed on a second side of the center point opposite to the first side. The housing further includes a dished region and a cushioning structure. The dished region is disposed in the lower half portion. The dished region has a first edge and a second edge. The first edge has a first angle with respect to the second edge. The first angle is between about 80 degrees and about 180 degrees. The cushioning structure fills the dished region.

Accordingly, in the display devices of some embodiments of the present disclosure, by disposing a crashworthy structure in the expected impact area, the crashworthy structure is preferentially destroyed when the display device is crushed. As such, the crashworthy structure deforms and absorbs the impact energy, thereby increasing collision time. To be more specific, in the present disclosure, the center point of the display device is assumed to be the expected point of impact. By connecting the center point and the fixed ends two by two, the greatest fan-shaped area included by any two of the connecting lines is obtained. Further, the crashworthy structure is disposed in the greatest area included. For example, crashworthy structures may be disposed through local thinning, perforation, or filling with different materials so that the crashworthy structures deform or buckle during impact testing and thus reduce the head injury criterion (HIC) number.

It is to be understood that both the foregoing general description and the following detailed description are by examples and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
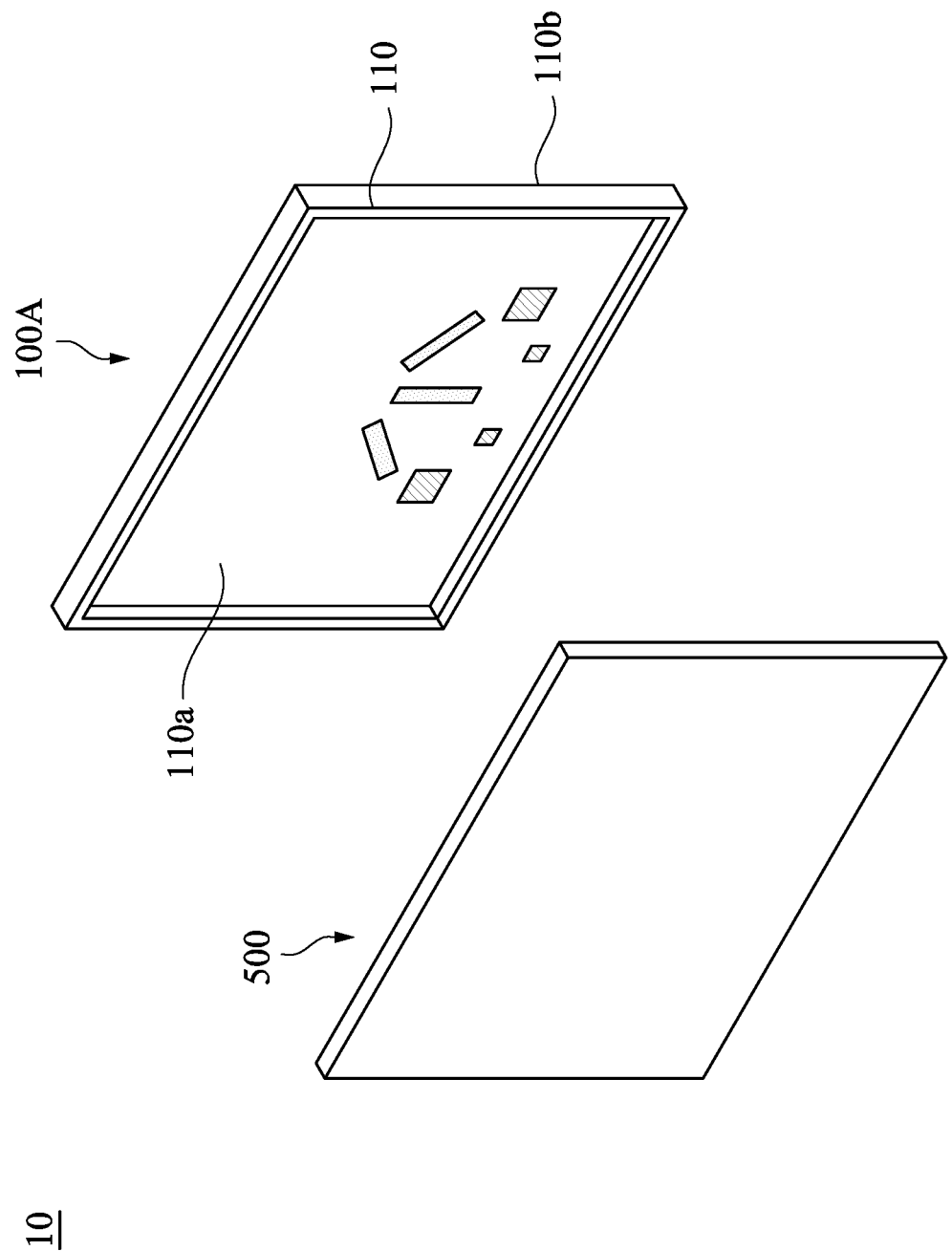
FIG. 1 is an exploded view of a display device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

For safety concerns, some regulations require that vehicle-mounted devices in a passenger vehicle not cause serious head injuries to passengers in a car accident. Therefore, the vehicle-mounted devices must pass a head impact test (HIT) to comprehensively evaluate the head acceleration and the impact duration when the vehicle-mounted device is hit. If the vehicle-mounted devices pass the HIT, it is ensured that their associated head injury criteria (HIC) comply with the regulations.

For example, the ECE-R21 regulation issued by the Economic Commission of Europe (ECE) requires that in a simulation test, when a sphere weighing 6.8 kg with a diameter of 165 mm hits a vehicle-mounted device at a speed of at least 24.1 kilometers per hour, the HIC number must be less than 1000.

Therefore, the present disclosure aims to provide a display device. The housing of this display device is equipped with a crashworthy structure to reduce the HIC number during impact testing through the collapse failure mechanism.

To be more specific, by disposing a crashworthy structure in the expected impact area, the crashworthy structure will be destroyed first (e.g., deformed or buckled) during the impact. Thus, the crashworthy structure absorbs the kinetic energy and leads to the redistribution of the impact force. Thereby, the impact duration is extended.

For example, taking a display device as an example, the main damage occurs between the point of impact and the fixed ends of the display device. Therefore, in some embodiments of the present disclosure, the center point of the display device is assumed to be the expected point of impact. By connecting the center point and the fixed ends two by two and disposing crashworthy structures (such as through local thinning, perforation or filling with different materials) in the greatest fan-shaped area included by these connecting lines and located between the center point and the fixed ends, the HIC number may be reduced.

It should be understood that although the center point of the display device is used as an example of the point of impact in this disclosure, the point of impact may be at any position of the display device. Therefore, connecting a point of impact at a position different from the center point and the fixed ends two by two and disposing crashworthy structures in the greatest fan-shaped area included by these connecting lines and located between the center point and the fixed ends can also achieve the effect of reducing the HIC number, without departing from the scope of this disclosure.

Reference is made to FIG. 1. FIG. 1 is an exploded view of a display device 10 according to some embodiments of the present disclosure. As shown in FIG. 1, the display device 10 includes a housing 100A and a display panel 500. The housing 100A is adjacent to the display panel 500. To be more specific, the housing 100A includes a main body 110. The main body 110 has a first surface 110a and a second surface 110b. The first surface 110a and the second surface 110b are opposite to each other. In some embodiments, as shown in FIG. 1, the main body 110 has a recessed structure. The first surface 110a is a bottom surface of the recessed structure. In addition, the reference coordinates (direction X, direction Y, and direction Z) are as shown in FIG. 1 and are used in subsequent figures.

Figure 2:
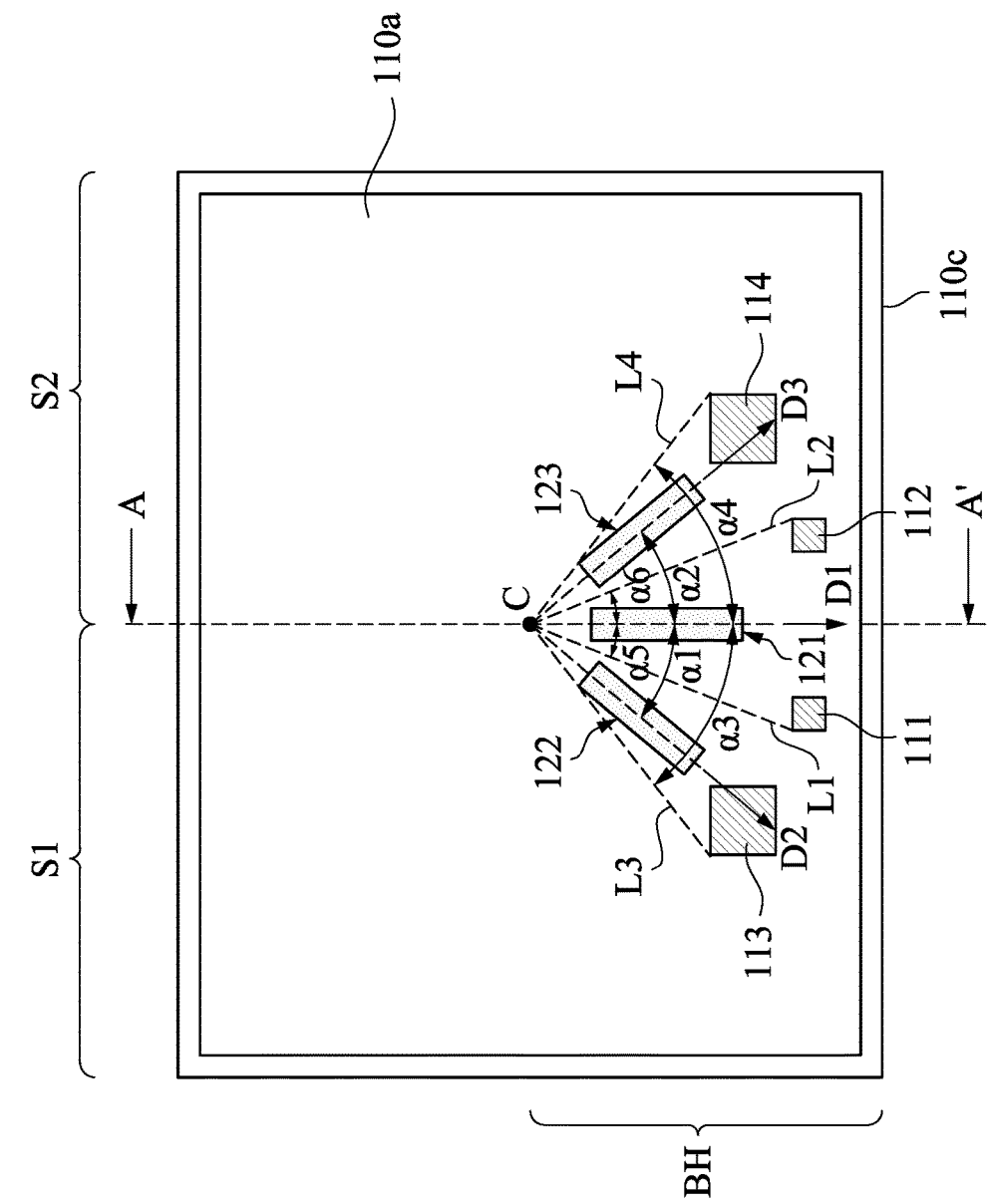
FIG. 2 is a front view of a housing according to some embodiments of the present disclosure.

Reference is made to FIG. 2. FIG. 2 is a front view of the housing 100A according to some embodiments of the present disclosure. As shown in FIG. 2, the housing 100A further includes a first fixed end 111, a second fixed end 112, a third fixed end 113, and a fourth fixed end 114. As shown in FIG. 2, the main body 110 further includes a bottom side 110c. The first surface 110a of the main body 110 has a center point C. The center point C and the bottom side 110c define the lower half portion BH of the main body 110. The first fixed end 111, the second fixed end 112, the third fixed end 113, and the fourth fixed end 114 are disposed in the lower half portion BH.

As shown in FIG. 2, a line A-A' coincides with a central axis of the main body 110. Based on the central axis, the main body 110 is divided into a first side S1 and a second side S2. The first fixed end 111 and the third fixed end 113 are disposed on the first side S1. The second fixed end 112 and the fourth fixed end 114 are disposed on the second side S2. In addition, a vertical distance from the third fixed end 113 to the central axis is greater than a vertical distance from the first fixed end 111 to the central axis. A vertical distance from the fourth fixed end 114 to the central axis is greater than a vertical distance from the second fixed end 112 to the central axis.

As shown in FIG. 2, a connecting line L1 connects the center point C and the first fixed end 111. A connecting line L2 connects the center point C and the second fixed end 112. A connecting line L3 connects the center point C and the third fixed end 113. A connecting line L4 connects the center point C and the fourth fixed end 114. An acute angle between the connecting line L3 and a first direction D1 is a third angle $\alpha 3$. An acute angle between the connecting line L4 and the first direction D1 is a fourth angle $\alpha 4$. An acute angle between the connecting line L1 and the first direction D1 is a fifth angle $\alpha 5$. An acute angle between the connecting line L2 and the first direction D1 is a sixth angle $\alpha 6$.

In some embodiments, the third angle $\alpha 3$ and the fourth angle $\alpha 4$ are between about 40 degrees and about 50 degrees. In some embodiments, the fifth angle $\alpha 5$ and the sixth angle $\alpha 6$ are between about 15 degrees and about 50 degrees. In the embodiments corresponding to FIG. 2, since the vertical distance from the third fixed end 113 to the central axis is greater than the vertical distance from the first fixed end 111 to the central axis, the third angle $\alpha 3$ is greater than the fifth angle $\alpha 5$. Similarly, since the vertical distance from the fourth fixed end 114 to the central axis is greater than the vertical distance from the second fixed end 112 to the central axis, the fourth angle $\alpha 4$ is greater than the sixth angle $\alpha 6$.

As aforementioned, a crashworthy structure is disposed between the point of impact and the fixed ends of the display device to reduce the HIC number. For example, taking the center point C of the housing 100A as the point of impact, a crashworthy structure is disposed in the greatest fan-shaped area included by any two the connecting line L1, the connecting line L2, the connecting line L3, and the connecting line L4. For example, as shown in FIG. 2, slots are provided in a fan-shaped area enclosed with the connecting line L3 and the connecting line L4 to achieve local thinning.

As shown in FIG. 2, the crashworthy structure of the housing 100A includes a first slot 121, a second slot 122, and a third slot 123. They are disposed in the lower half portion BH. A longitudinal axis of the first slot 121 is shown by the dotted line and extends along the first direction D1. The first direction D1 passes through the center point C and is substantially perpendicular to the bottom side 110c. In some embodiments, the longitudinal axis of the first slot 121 coincides with the central axis of the main body 110, as shown in FIG. 2.

A longitudinal axis of the second slot 122 is shown by the dotted line in FIG. 2 and extends along the second direction D2. The second direction D2 passes through the center point C. As shown in FIG. 2, the acute angle between the second direction D2 and the first direction D1 is the first angle $\alpha 1$. Similarly, a longitudinal axis of the third slot 123 extends along the third direction D3 as shown by the dotted line in FIG. 2. The third direction D3 passes through the center point C. The acute angle between the third direction D3 and the first direction D1 is the second angle $\alpha 2$.

To ensure that the crashworthy structure falls within the area where collapse failure is expected to occur, the first slot 121, the second slot 122, and the third slot 123 are disposed at the greatest area included by any two of the connecting line L1, the connecting line L2, the connecting line L3, and the connecting line L4. In other words, in some embodiments, the first angle $\alpha 1$ and the second angle $\alpha 2$ are less than or equal to the greatest angle among the third angle $\alpha 3$, the fourth angle $\alpha 4$, the fifth angle $\alpha 5$, and the sixth angle $\alpha 6$. To be more specific, the first angle $\alpha 1$ is less than or equal to the greater one of the third angle $\alpha 3$ and the fifth angle $\alpha 5$. The second angle $\alpha 2$ is less than or equal to the greater one of the fourth angle $\alpha 4$ and the sixth angle $\alpha 6$.

As aforementioned, deduced from the relationship between the vertical distances from the fixed ends to the central axis, the third angle $\alpha 3$ is greater than the fifth angle $\alpha 5$, and the fourth angle $\alpha 4$ is greater than the sixth angle $\alpha 6$. Therefore, in the embodiments corresponding to FIG. 2, the first angle $\alpha 1$ is less than or equal to the third angle $\alpha 3$. The second angle $\alpha 2$ is less than or equal to the fourth angle $\alpha 4$. In some embodiments, the first angle $\alpha 1$ and the second angle $\alpha 2$ are between about 30 degrees and about 50 degrees.

To ensure that the collapse of the crashworthy structure can effectively absorb the impact while maintaining the strength of the display device to be higher than a standard value under static testing, in some embodiments, a ratio between a sum of base areas of the first slot 121, the second slot 122, and the third slot 123 and an area of the main body 110 is between about 5% and about 50%.

Figure 3:
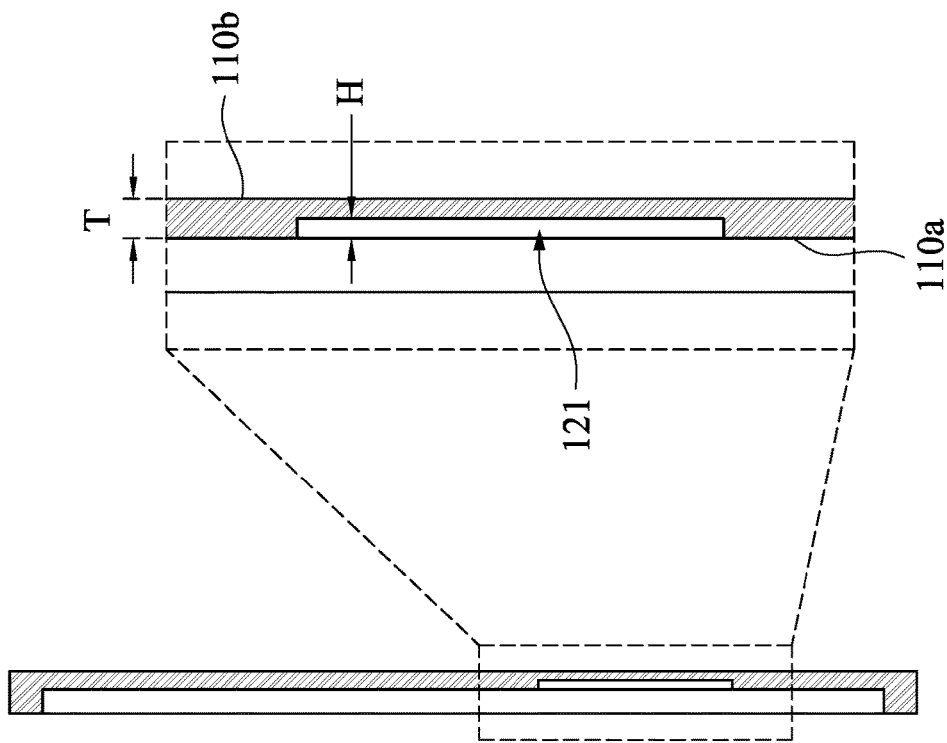
FIG. 3 is a cross-sectional view of a housing along a line A-A' in FIG. 2 according to some embodiments of the present disclosure.

Reference is made to FIG. 3. FIG. 3 is a cross-sectional view of the housing 100A along the line A-A' in FIG. 2 according to some embodiments of the present disclosure. In some embodiments, as shown in FIG. 3, the first slot 121 is recessed from the first surface 110a. Similarly, in some embodiments, the second slot 122 and the third slot 123 may be recessed from the first surface 110a. In some embodiments, a ratio between depths H of the first slot 121, the second slot 122, and the third slot 123 recessed from the first surface 110a and a thickness T of the recessed structure of the main body 110 is between about 45% and about 55%. For example, in some embodiments, the thickness T is about 2 mm, and the depths H are about 1 mm.

Figure 4:
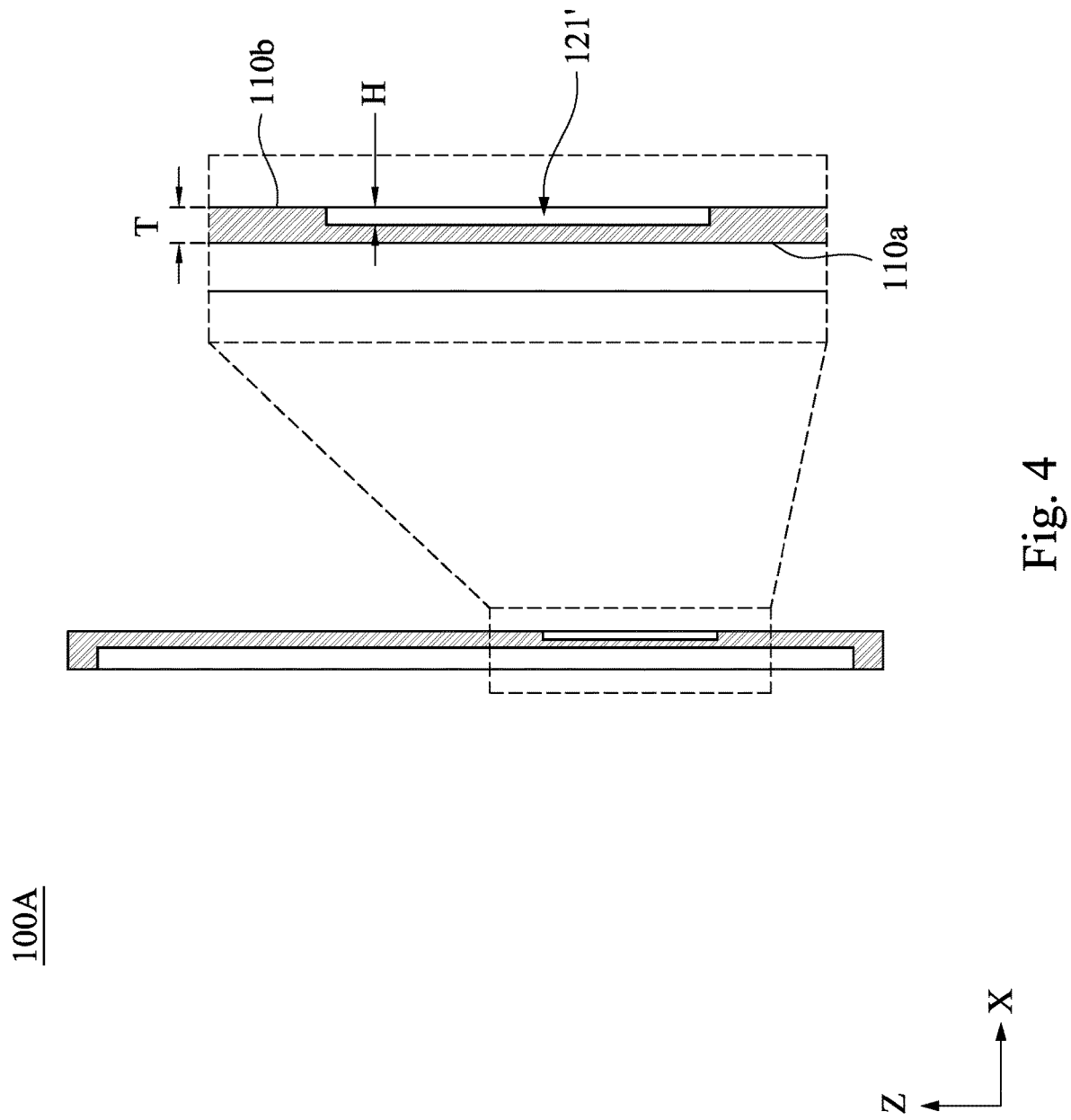
FIG. 4 is a cross-sectional view of a housing according to some other embodiments of the present disclosure.

Reference is made to FIG. 4. FIG. 4 is a cross-sectional view of the housing 100A according to some other embodiments of the present disclosure. In some embodiments, as shown in FIG. 4, the first slot 121' is recessed from the second surface 110b. Similarly, in some embodiments, the second slot 122 and the third slot 123 may be recessed from the second surface 110b. Similarly, in some embodiments, a ratio between depths H of the first slot 121', the second slot 122, and the third slot 123 recessed from the second surface 110b and a thickness T of the recessed structure of the main body 110 is between about 45% and about 55%.

Figure 5:
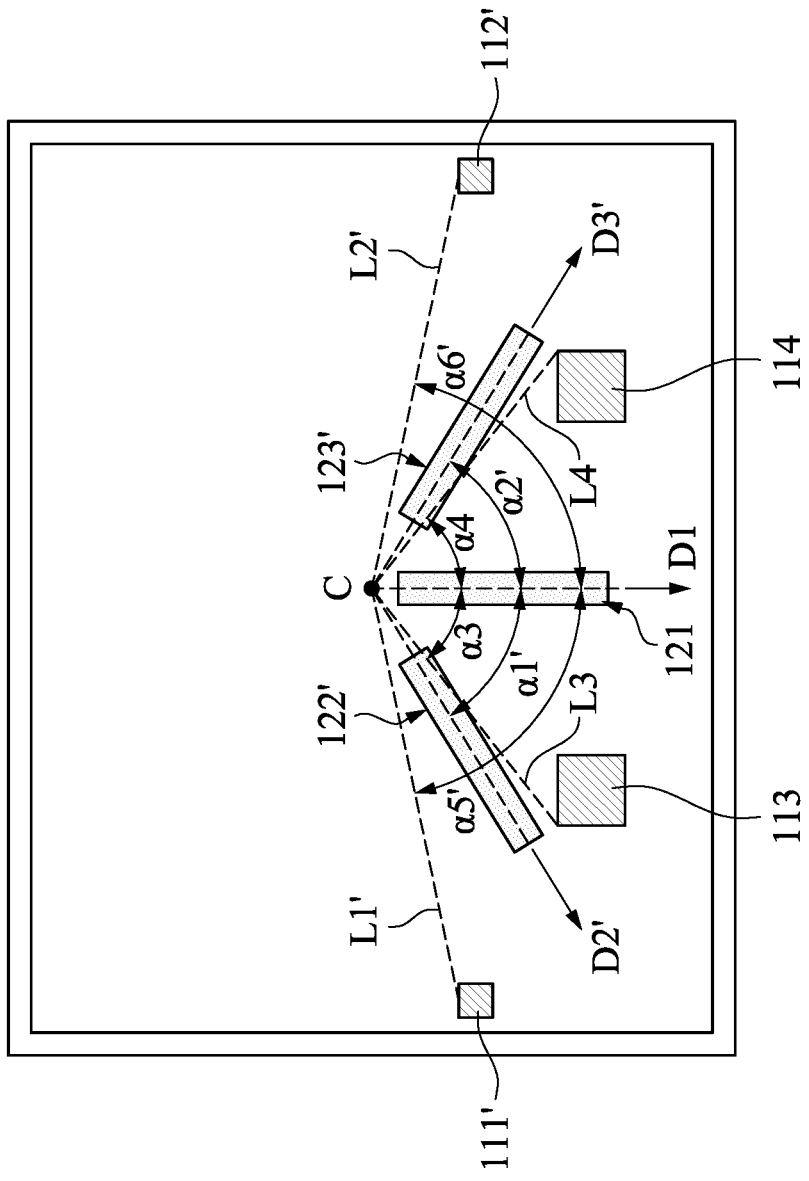
FIG. 5 is a front view of a housing according to some embodiments of the present disclosure.

Reference is made to FIG. 5. FIG. 5 is a front view of the housing 100B according to some embodiments of the present disclosure. The difference between the housing 100B and the housing 100A is that the housing 100B includes a second slot 122', a third slot 123', a first fixed end 111', and a second fixed end 112'. As shown in FIG. 5, a connecting line L1' connects the center point C and the first fixed end 111'. A connecting line L2' connects the center point C and the second fixed end 112'. The acute angle between the connecting line L1' and the first direction D1 is the fifth angle $\alpha 5'$. The acute angle between the connecting line L2' and the first direction D1 is the sixth angle $\alpha 6'$. As shown in FIG. 5, a vertical distance from the third fixed end 113 to the central axis is less than a vertical distance from the first fixed end 111' to the central axis. A vertical distance from the fourth fixed end 114 to the central axis is less than a vertical distance from the second fixed end 112' to the center axis. Therefore, the fifth angle $\alpha 5'$ is greater than the third angle $\alpha 3$. The sixth angle $\alpha 6'$ is greater than the fourth angle $\alpha 4$. In some embodiments, the third angle $\alpha 3$ and the fourth angle $\alpha 4$ are between about 40 degrees and about 50 degrees. In some embodiments, the fifth angle $\alpha 5'$ and the sixth angle $\alpha 6'$ are between about 40 degrees and about 90 degrees.

As aforementioned, a crashworthy structure is disposed between the point of impact and the fixed ends of the display device to reduce the HIC number. For example, taking the center point C of the housing 100B as the point of impact, a crashworthy structure is disposed in the greatest fan-shaped area includes by any two of the connecting line L1', the connecting line L2', the connecting line L3, and the connecting line L4. For example, as shown in FIG. 5, slots are disposed in a fan-shaped area includes by the connecting line L1' and the connecting line L2' to achieve local thinning.

As shown in FIG. 5, the crashworthy structure of the housing 100B includes a first slot 121, a second slot 122', and a third slot 123'. A longitudinal axis of the second slot 122' is shown by the dotted line and extends along the second direction D2'. The second direction D2' passes through the center point C. As shown in FIG. 5, an acute angle between the second direction D2' and the first direction D1 is a first angle $\alpha 1'$. Similarly, a longitudinal axis of the third slot 123' extends along the third direction D3' as shown by the dotted line in FIG. 5. The third direction D3' passes through the center point C. An acute angle between the third direction D3 'and the first direction D1 is a second angle $\alpha 2'$.

To ensure that the crashworthy structure falls within the area where collapse failure is expected to occur, the first slot 121, the second slot 122', and the third slot 123' are disposed at the greatest fan-shaped area includes by any two of the connecting line L1', the connecting line L2', the connecting line L3, and the connecting line L4. In other words, in some embodiments, the first angle α1' and the second angle α2' are less than or equal to the greatest angle among the third angle α3, the fourth angle α4, the fifth angle α5', and the sixth angle α6'. To be more specific, the first angle α1' is less than or equal to the greater one of the third angle α3 and the fifth angle α5'. The second angle α2' is less than or equal to the greater one of the fourth angle α4 and the sixth angle α6'.

As aforementioned, deduced from the relationship between the vertical distances from the fixed ends to the central axis, the fifth angle α5' is greater than the third angle α3. The sixth angle α6' is greater than the fourth angle α4. Therefore, in the embodiments corresponding to FIG. 5, the first angle α1' is less than or equal to the fifth angle α5'. The second angle α2' is less than or equal to the sixth angle α6'. In some embodiments, the first angle α1' and the second angle α2' are between about 30 degrees and about 65 degrees.

Figure 6:
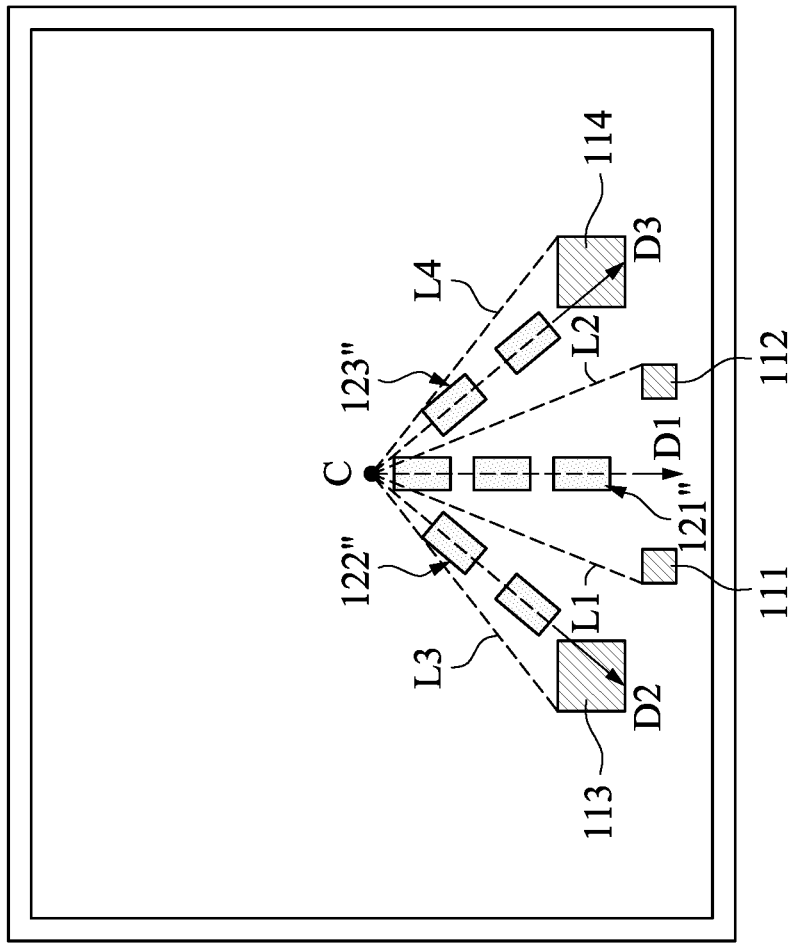
FIG. 6 is a front view of a housing according to some embodiments of the present disclosure.

Reference is made to FIG. 6. FIG. 6 is a front view of the housing 100C according to some embodiments of the present disclosure. The difference between the housing 100C and the housing 100A is that the housing 100C includes a plurality of first slots 121", second slots 122", and third slots 123". As shown in FIG. 6, a longitudinal axis of the first slots 121" is the same as the longitudinal axis of the first slot 121 of the housing 100A and extends along the first direction D1. The first slots 121" are arranged along the first direction D1. Similarly, a longitudinal axis of the second slots 122" is the same as the longitudinal axis of the second slot 122 of the housing 100A and extends along the second direction D2. The second slots 122" are arranged along the second direction D2. A longitudinal axis of the third slots 123" is the same as the longitudinal axis of the third slot 123 of the housing 100A and extends along the third direction D3. The third slots 123" are arranged along the third direction D3.

On the other hand, as shown in FIG. 6, the directions of the connecting lines connecting the fixed ends and the center point C of the housing 100C are the same as those of the housing 100A. The angles and the relationships among the connecting lines of the housing 100C are also the same as those of the housing 100A and will not be described again here.

In some embodiments, the fixed ends of the housing 100C can be modified as the fixed ends of the housing 100B. Also, a plurality of slots may be disposed in a fan-shaped area includes by the connecting line L1' and the connecting line L2' of the housing 100B.

Figure 7:
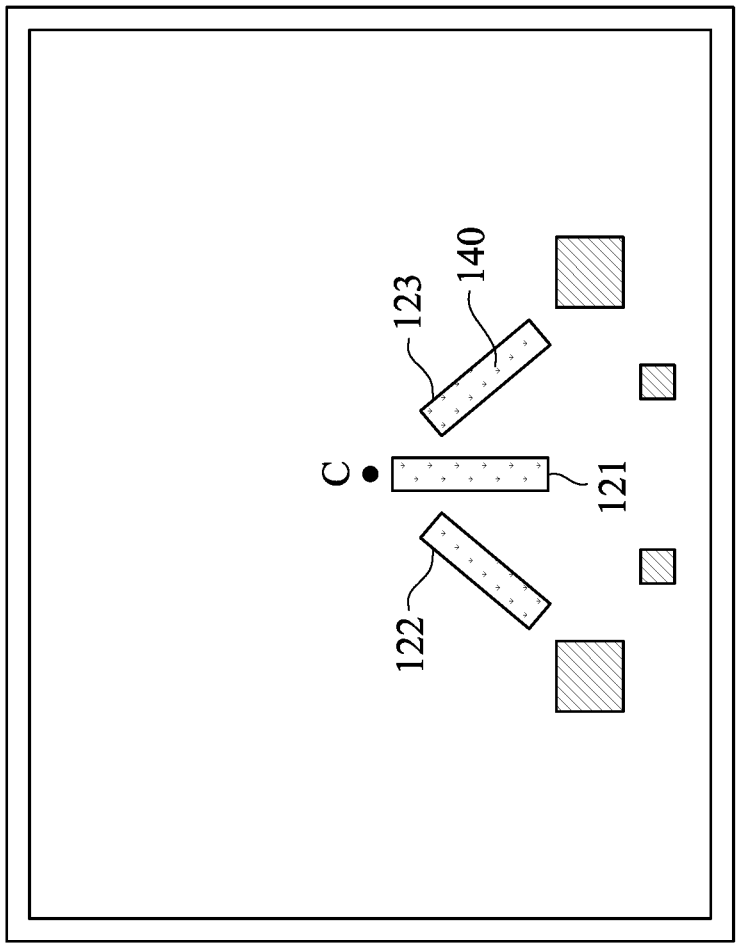
FIG. 7 is a front view of a housing according to some embodiments of the present disclosure.

Reference is made to FIG. 7. FIG. 7 is a front view of the housing 100D according to some embodiments of the present disclosure. The difference between the housing 100D and the housing 100A is that the housing 100D further includes a plurality of cushioning structures 140. The cushioning structures 140 are filled in the first slot 121, the second slot 122, and the third slot 123. The deformation of the cushioning structures 140 helps to prolong the impact duration and absorb the kinetic energy. For example, in some embodiments, the material of the cushioning structures 140 may be a polymer material or a silicone material, but the disclosure is not limited thereto. Similar cushioning structures 140 may also be applied in the slots of the housing 100B and the housing 100C.

In terms of manufacturing process, the slots in the housing 100A to the housing 100D can be formed by using a pre-processed mold during die casting of the housing. For example, a housing containing magnesium-aluminum alloy (e.g., AZ91D) as the main material can have slots formed through a die-casting process.

Figure 8:
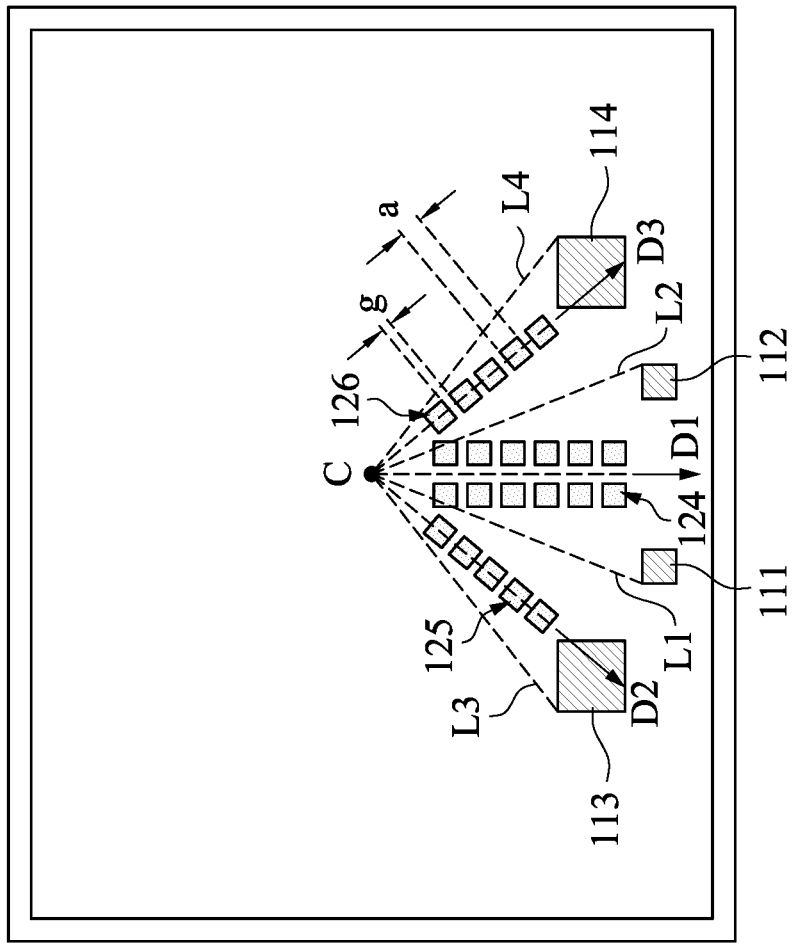
FIG. 8 is a front view of a housing according to some embodiments of the present disclosure.

Reference is made to FIG. 8. FIG. 8 is a front view of the housing 200A according to some embodiments of the present disclosure. The difference between the housing 200A and the housing 100A is that the housing 200A includes a plurality of first holes 124, second holes 125, and third holes 126. As shown in FIG. 8, the first holes 124 are arranged along the first direction D1. The second holes 125 are arranged along the second direction D2. The third holes 126 are arranged along the third direction D3. In some embodiments, the first holes 124, the second holes 125, and the third holes 126 may be arranged in rows along their corresponding directions. For example, as shown in FIG. 8, the housing 200A has two rows of the first holes 124 arranged along the first direction D1.

In some embodiments, similar to the housing 100A, the first holes 124, the second holes 125, and the third holes 126 are recessed from the first surface 110a or the second surface 110b. A ratio between recessed depths H of the first holes 124, the second holes 125, and the third holes 126 and a thickness T of the recessed structure of the main body 110 is between about 45% and about 55%.

In some embodiments, as shown in FIG. 8, the first holes 124, the second holes 125, and the third holes 126 are rectangular. Each rectangle has a side length a between about 0.5 mm and about 5 mm. In some embodiments, the distance g between any two adjacent ones of the first holes 124, the second holes 125, and the third holes 126 along their corresponding directions is between about 0.5 mm and about 5 mm.

To ensure that the collapse of the crashworthy structure can effectively buffer the impact while maintaining the strength of the display device to be higher than a standard value under static testing, in some embodiments, a ratio between a sum of the cross-sectional areas of the first holes 124, the second holes 125, and the third holes 126 and the area of the main body 110 is between about 5% and about 50%.

On the other hand, as shown in FIG. 8, the directions of the connecting lines connecting the fixed ends and the center point C of the housing 200A are the same as those of the housing 100A. The angles and the relationships among the connecting lines of the housing 200A are also the same as those of the housing 100A and will not be described again here.

In this way, by perforation or disposing slots in the fan-shaped area included by the connecting line L3 and the connecting line L4, local thinning may be achieved and the effect of structural weakening can be realized.

Figure 9:
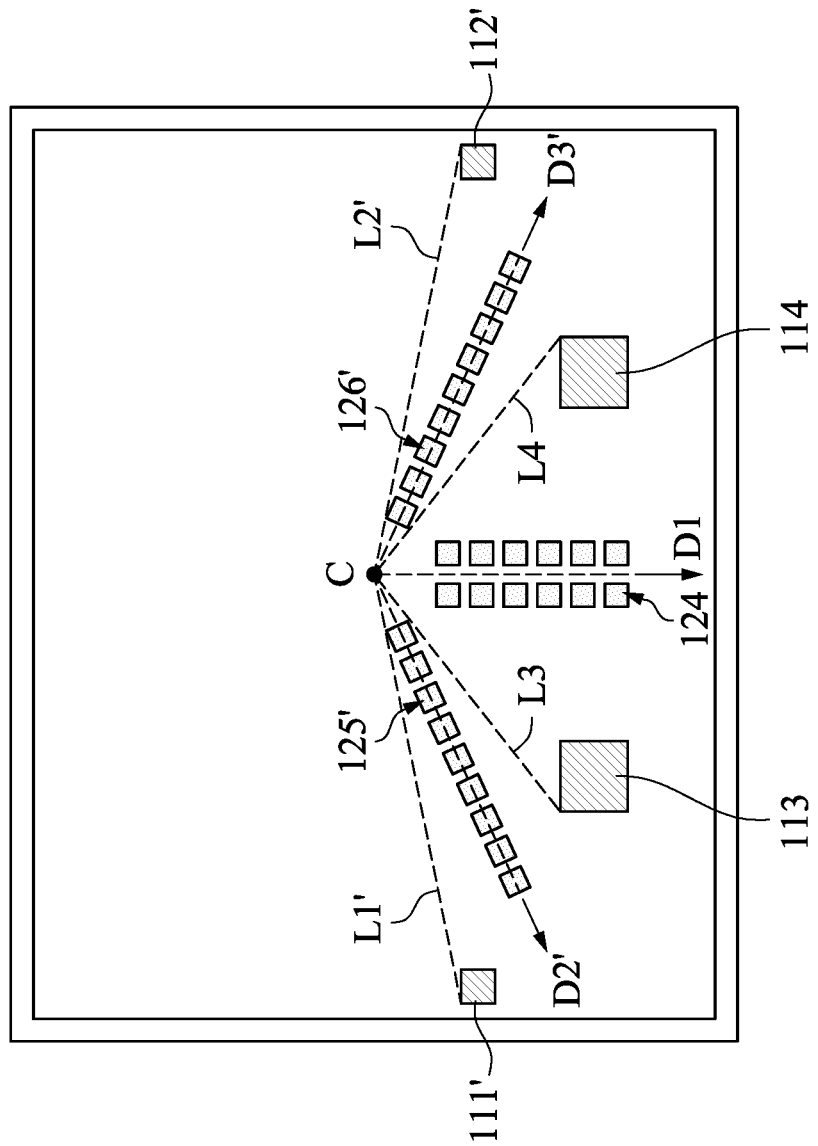
FIG. 9 is a front view of a housing according to some embodiments of the present disclosure.

Reference is made to FIG. 9. FIG. 9 is a front view of the housing 200B according to some embodiments of the present disclosure. The difference between the housing 200B and the housing 200A is that the housing 200B includes a plurality of second holes 125', third holes 126', a first fixed end 111', and a second fixed end 112'. As shown in FIG. 9, the second holes 125' are arranged along the second direction D2'. Similarly, the third holes 126' are arranged along the third direction D3'.

As shown in FIG. 9, the first fixed end 111' and the second fixed end 112' of the housing 200B are similar to the first fixed end 111' and the second fixed end 112' of the housing 100B. The fixed ends are connected to the center point C in the same directions as the fixed ends of the housing 100B. Also, the relationships among the angles formed by the first direction D1, the second direction D2', and the third direction D3' of the housing 200B are the same as those of the housing 100B.

In this way, by perforation or disposing slots in the fan-shaped area includes by the connecting line L1' and the connecting line L2', local thinning may be achieved and the effect of structural weakening can be realized.

In some embodiments, the cushioning structures 140 may also be applied in the holes of the housing 200A and the housing 200B. The deformation of the cushioning structures 140 helps to prolong the impact duration and absorb the kinetic energy.

Figure 10:
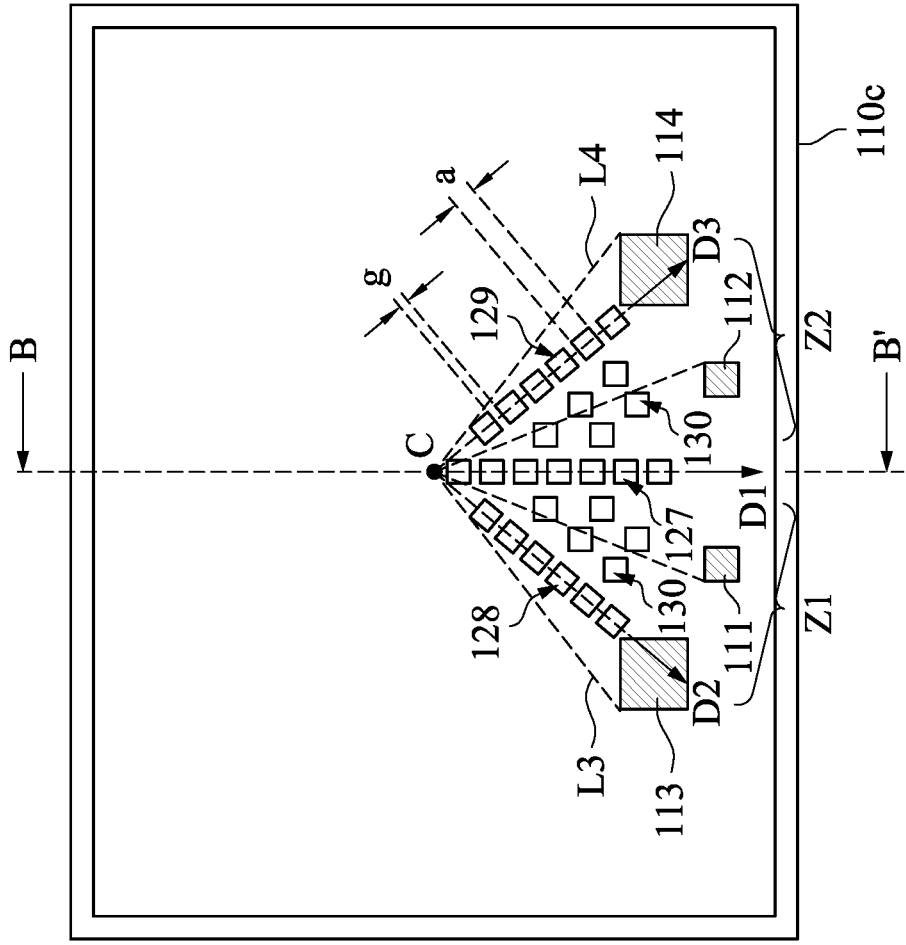
FIG. 10 is a front view of a housing according to some embodiment of the present disclosure.
Figure 11:
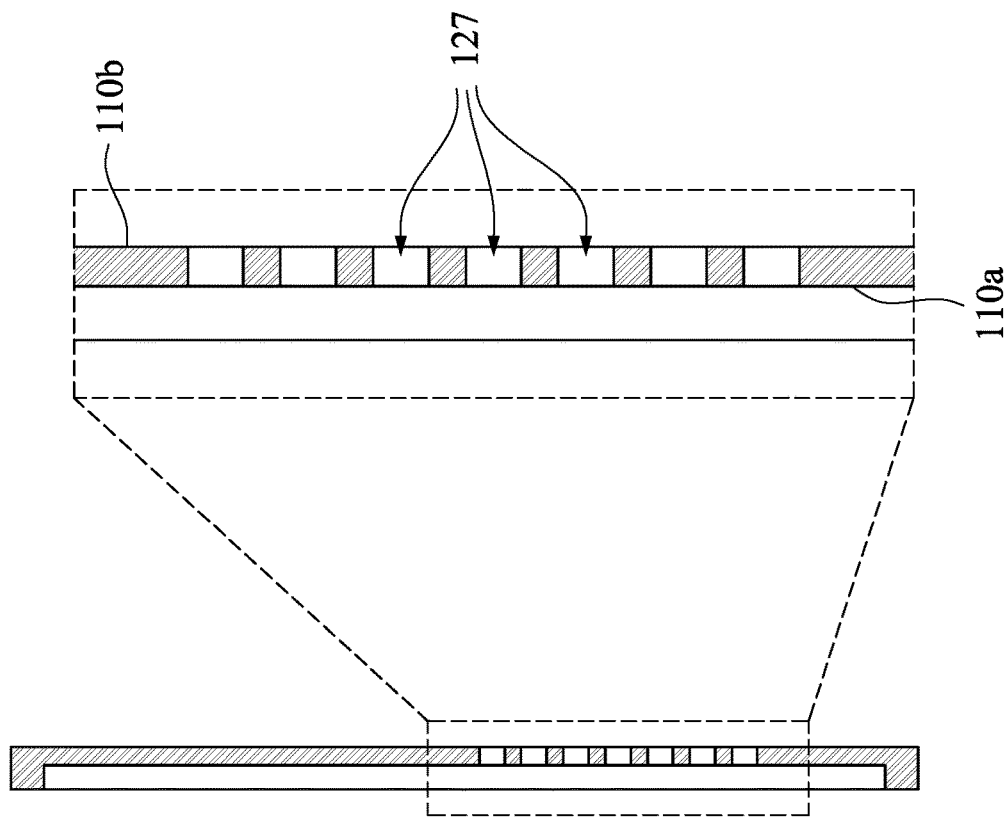
FIG. 11 is a cross-sectional view of a housing along a line B-B' in FIG. 10 according to some embodiment of the present disclosure.

Reference is made to FIG. 10 and FIG. 11. FIG. 10 is a front view of a housing 200C according to some embodiment of the present disclosure. FIG. 11 is a cross-sectional view of the housing 200C along a line B-B' in FIG. 10. As shown in FIG. 10 and FIG. 11, the difference between the housing 200C and the housing 200A is that the housing 200C includes a plurality of first holes 127, second holes 128, third holes 129, and fourth holes 130. The first holes 127, the second holes 128, the third holes 129, and the fourth holes 130 penetrate through the main body 110. As shown in FIG. 10, the first holes 127 are arranged along the first direction D1, the second holes 128 are arranged along the second direction D2, the third holes 129 are arranged along the third direction D3, and the fourth holes 130 are randomly scattered in a zone Z1 and a zone Z2. The zone Z1 is defined by the first holes 127 and the second holes 128. The zone Z2 is defined by the first holes 127 and the third holes 129.

In some embodiments, as shown in FIG. 10, the first holes 127, the second holes 128, and the third holes 129 are rectangular. Each rectangle has a side length a between about 0.5 mm and about 5 mm. In some embodiments, the distance g between any two adjacent ones of the first holes 127, the second holes 128, the third holes 129, and the fourth holes 130 is between about 0.5 mm and about 5 mm.

On the other hand, as shown in FIG. 10, the directions of the connecting lines connecting the fixed ends and the center point C of the housing 200C are the same as those of the housing 100A. The angles formed by the first direction D1, the second direction D2, and the third direction D3 of the housing 200C and the relationships among them are also the same as those of the housing 100A and will not be described again here.

In this way, by perforation in the fan-shaped area included by the connecting line L3 and the connecting line L4, the effect of structural weakening can be achieved. In some embodiments, the fixed ends of the housing 200C can be modified into those of the housing 200B and perforation is performed in a fan-shaped area included by the connecting line L1' and the connecting line L2' of the housing 200B.

Figure 12:
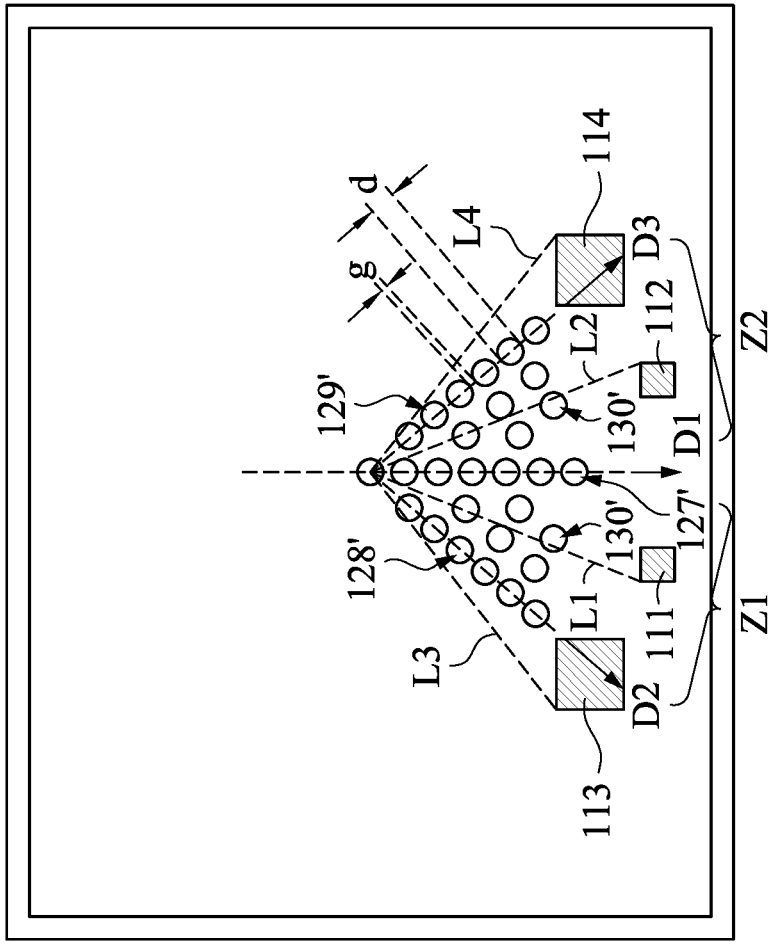
FIG. 12 is a front view of a housing according to some embodiments of the present disclosure.

Reference is made to FIG. 12. FIG. 12 is a front view of the housing 200D according to some embodiments of the present disclosure. The difference between the housing 200D and the housing 200C is that, as shown in FIG. 12, the housing 200D includes first holes 127', second holes 128', third holes 129', and fourth holes 130'. In some embodiments, the first holes 127', the second holes 128', the third holes 129', and the fourth holes 130' are circular. Each circular hole has a diameter d between about 0.5 mm and about 5 mm. In some embodiments, the distance g between any adjacent ones of the first holes 127', the second holes 128', the third holes 129', and the fourth holes 130' is between about 0.5 mm and about 5 mm.

On the other hand, as shown in FIG. 12, the directions of the connecting lines connecting the fixed ends and the center point C of the housing 200D are the same as those of the housing 100A. The angles formed by the first direction D1, the second direction D2, and the third direction D3 of the housing 200D and the relationships among them are also the same as those of the housing 100A and will not be described again here.

Figure 13:
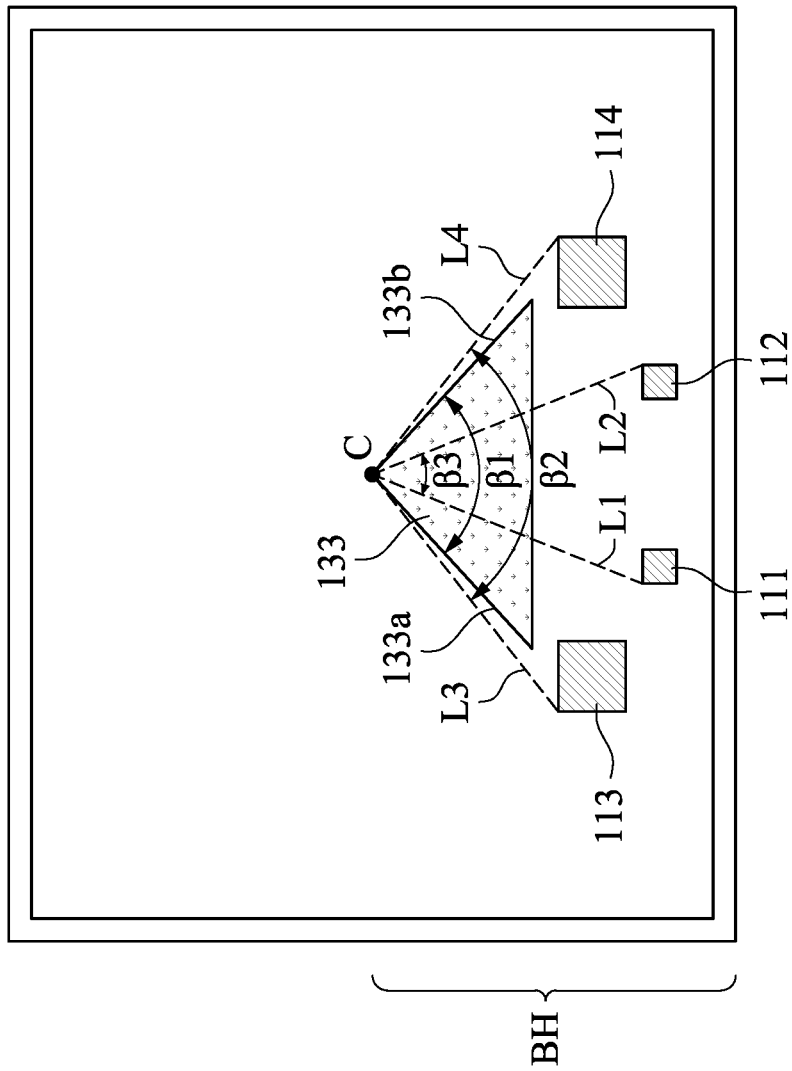
FIG. 13 is a front view of a housing according to some embodiments of the present disclosure.

Reference is made to FIG. 13. FIG. 13 is a front view of the housing 300 according to some embodiments of the present disclosure. The difference between the housing 300 and the housing 100A is that the housing 300 includes a dished region 133 as shown in FIG. 13. The dished region 133 is disposed in the lower half portion BH of the main body 110. The dished region 133 has a first edge 133a and a second edge 133b. The first edge 133a and the second edge 133b intersect at the center point C. There is a first angle β1 between the first edge 133a and the second edge 133b.

As shown in FIG. 13, similar to the housing 100A, a connecting line L1 connects the center point C of the housing 300 and the first fixed end 111. A connecting line L2 connects the center point C and the second fixed end 112. A connecting line L3 connects the center point C and the third fixed end 113. A connecting line L4 connects the center point C and the fourth fixed end 114. The connecting line L3 and the connecting line L4 form a second angle β2. The connecting line L1 and the connecting line L2 form a third angle β3. In some embodiments, the second angle β2 is between about 80 degrees and about 180 degrees. The third angle β3 is between about 80 degrees and about 180 degrees.

To ensure that the crashworthy structure falls within the area where collapse failure is expected to occur, the dished region 133 is completely disposed in the fan-shaped area included by the connecting line L3 and the connecting line L4. In some embodiments, the first angle β1 is less than or equal to the greater one of the second angle β2 and the third angle β3. For example, as shown in FIG. 13, the vertical distance from the third fixed end 113 to the central axis is greater than the vertical distance from the first fixed end 111 to the central axis. The vertical distance from the fourth fixed end 114 to the central axis is greater than the vertical distance from the second fixed end 112 to the central axis. Therefore, the second angle β2 is greater than the third angle β3. As a result, the first angle 1 is less than or equal to the second angle β2. In some embodiments, the first angle β1 is between about 80 degrees and about 180 degrees.

In some embodiments, the fixed ends of the housing 300 can be modified as the fixed ends of the housing 100B, and a dished region 133 can be disposed in the fan-shaped area included by the connecting line L1' and the connecting line L2' of the housing 100B. As a result, the first angle β1 is less than or equal to the third angle β3.

At the same time, to ensure that the collapse of the crashworthy structure can effectively buffer the impact and maintain the strength of the display device to be higher than a standard value under static testing, in some embodiments, a ratio of a bottom area of the dished region 133 and the area of the main body 110 is between about 5% and about 50%.

Figure 14:
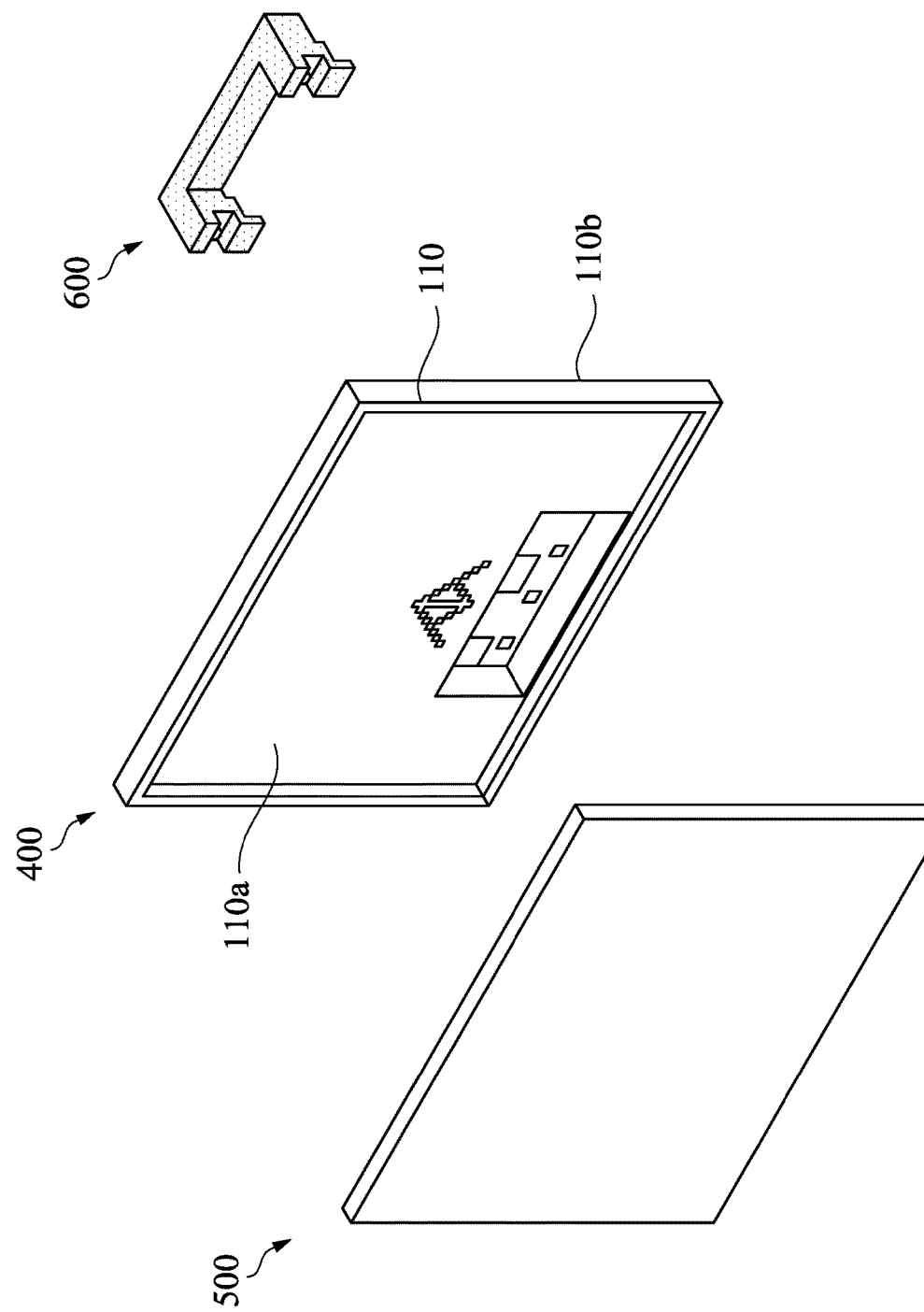
FIG. 14 is an exploded view of a display device according to some embodiments of the present disclosure.

Reference is made to FIG. 14. FIG. 14 is an exploded view of the display device 20 according to some embodiments of the present disclosure. As shown in FIG. 14, the display device 20 includes a housing 400, a display panel 500, and a cantilever 600. The housing 400 is adjacent to the display panel 500. Moreover, the housing 400 includes a main body 110. The main body 110 has a first surface 110a and a second surface 110b. The first surface 110a and the second surface 110b are opposite to each other. In some embodiments, as shown in FIG. 14, the main body 110 has a recessed structure. The first surface 110a is the bottom surface of the recessed structure. The cantilever 600 is adjacent to the second surface 110b of the main body 110 and is fixed to the housing 400 (e.g., through the third fixed end 113 and the fourth fixed end 114 shown in FIG. 15). An example of an attachment method is described in following paragraphs.

Figure 15:
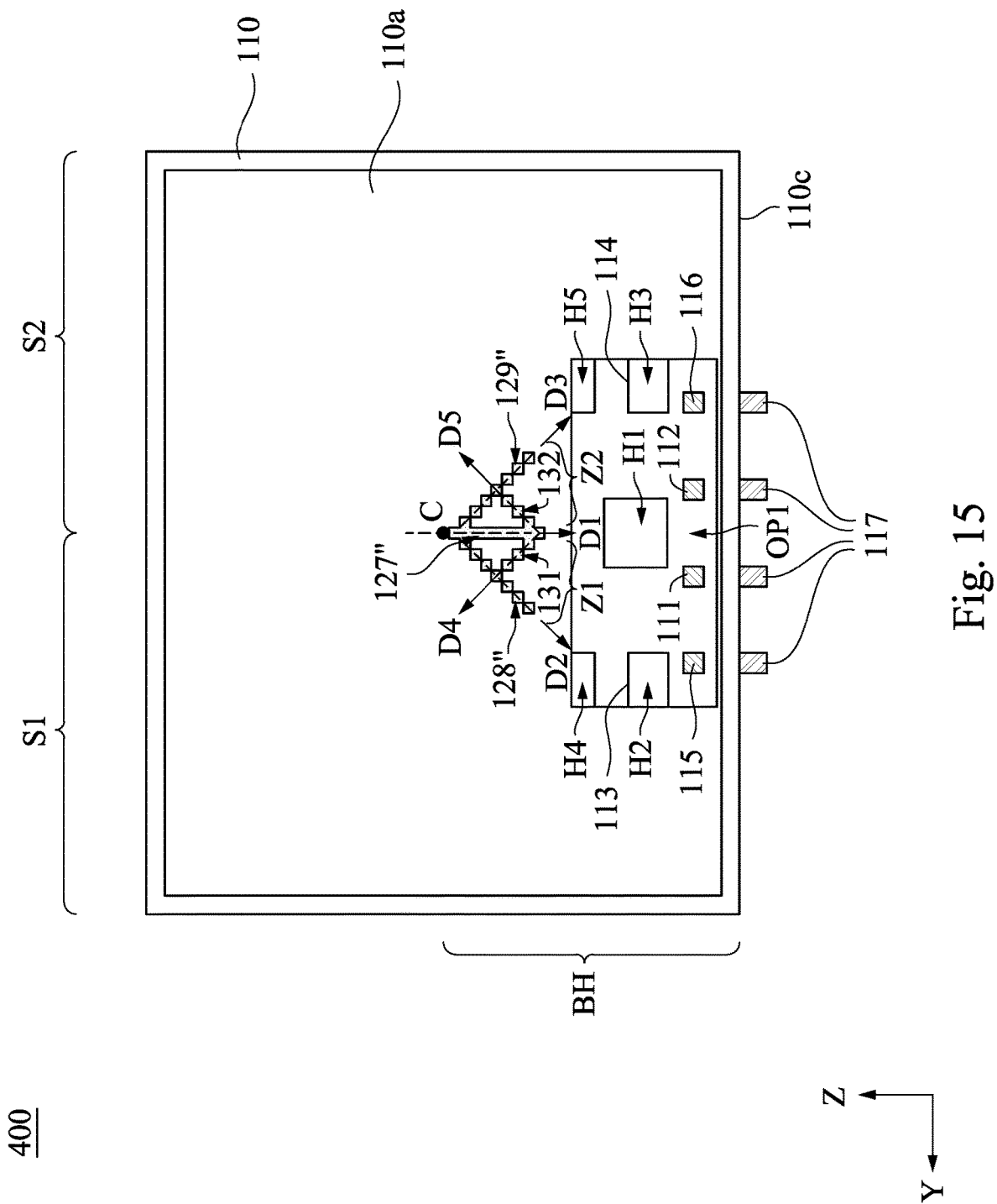
FIG. 15 is a front view of a housing according to some embodiments of the present disclosure.

Reference is made to FIG. 15. FIG. 15 is a front view of the housing 400 according to some embodiments of the present disclosure. As shown in FIG. 15, the housing 400 further includes a first fixed end 111, a second fixed end 112, a third fixed end 113, and a fourth fixed end 114. The housing 400 has a bottom side 110c. The first surface 110a of the main body 110 has a center point C. The center point C and the bottom side 110c define the lower half portion BH of the main body 110. As shown in FIG. 15, the first fixed end 111, the second fixed end 112, the third fixed end 113, and the fourth fixed end 114 are disposed in the lower half portion BH.

In some embodiments, as shown in FIG. 15, the housing 400 includes first holes 127", second holes 128", third holes 129", fifth holes 131, and sixth holes 132. As shown in FIG. 15, the first holes 127", the second holes 128", the third holes 129", the fifth holes 131, and the sixth holes 132 are disposed in the lower half portion BH of the main body 110.

In some embodiments, the first holes 127" may be formed by a plurality of square holes arranged along the first direction D1 and connected with one another, as shown in FIG. 15. The second holes 128" are formed and connected along the second direction D2. The third holes 129" are formed and connected along the third direction D3. As shown in FIG. 15, the first holes 127" and the second holes 128" define a zone Z1. The first holes 127" and the third holes 129" define a zone Z2. The angles formed by the first direction D1, the second direction D2, the third direction D3, and the connecting lines connecting the fixed ends and the center point C of the housing 400 are the same as those of the housing 100A and will not be described again here.

As shown in FIG. 15, the fifth holes 131 are disposed in the zone Z1. The fifth holes 131 are formed and connected along the fourth direction D4. The fourth direction D4 extends and intersects with the first direction D1 and the second direction D2. One of the fifth holes 131 is adjacent to one of the second holes 128". Another one of the fifth holes 131 is adjacent to one side of the first holes 127". Similarly, the sixth holes 132 are disposed in the zone Z2. The sixth holes 132 are formed and connected along the fifth direction D5. The fifth direction D5 extends and intersects with the first direction D1 and the third direction D3. One of the sixth holes 132 is adjacent to one of the third holes 129". Another one of the sixth holes 132 is adjacent to the other side of the first holes 127".

To ensure that the collapse of the crashworthy structure can effectively buffer the impact, while maintaining the strength of the display device to be higher than the standard value under static testing, in some embodiments, a ratio between a sum of the bottom areas of the first holes 127", the second holes 128", the third holes 129", the fifth holes 131, and the sixth holes 132 and the area of the main body 110 is between about 5% and about 50%.

In some embodiments, as shown in FIG. 15, the lower half portion BH of the main body 110 further includes an recessed region OP1, a fifth fixed end 115, and a sixth fixed end 116. The recessed region OP1 is recessed from the first surface 110a. The first fixed end 111, the second fixed end 112, the third fixed end 113, the fourth fixed end 114, the fifth fixed end 115, and the sixth fixed end 116 are disposed on the bottom surface of the recessed region OP1.

Similar to the housing 100A, the housing 400 is divided into a first side S1 and a second side S2 based on the central axis of the main body 110. As shown in FIG. 15, the first fixed end 111, the third fixed end 113, and the fifth fixed end 115 are disposed on the first side S1. The second fixed end 112, the fourth fixed end 114, and the sixth fixed end 116 are disposed on the second side S2.

In the embodiments of the display device 20, the housing 400 is connected to an in-vehicle device such as a dashboard of the vehicle through the cantilever 600. To be more specific, a hole H2, a hole H3, a hole H4, and a hole H5 are disposed on the bottom surface of the recessed region OP1 of the housing 400 for the cantilever 600 to engage with the housing 400. In addition, the hole H2 and the hole H3 correspond to the positions of the third fixed end 113 and the fourth fixed end 114 and are configured for fixing the cantilever 600 and the housing 400, but the disclosure is not limited thereto. In addition, a hole H1 is provided on the bottom surface of the recessed region OP1.

Figure 16:
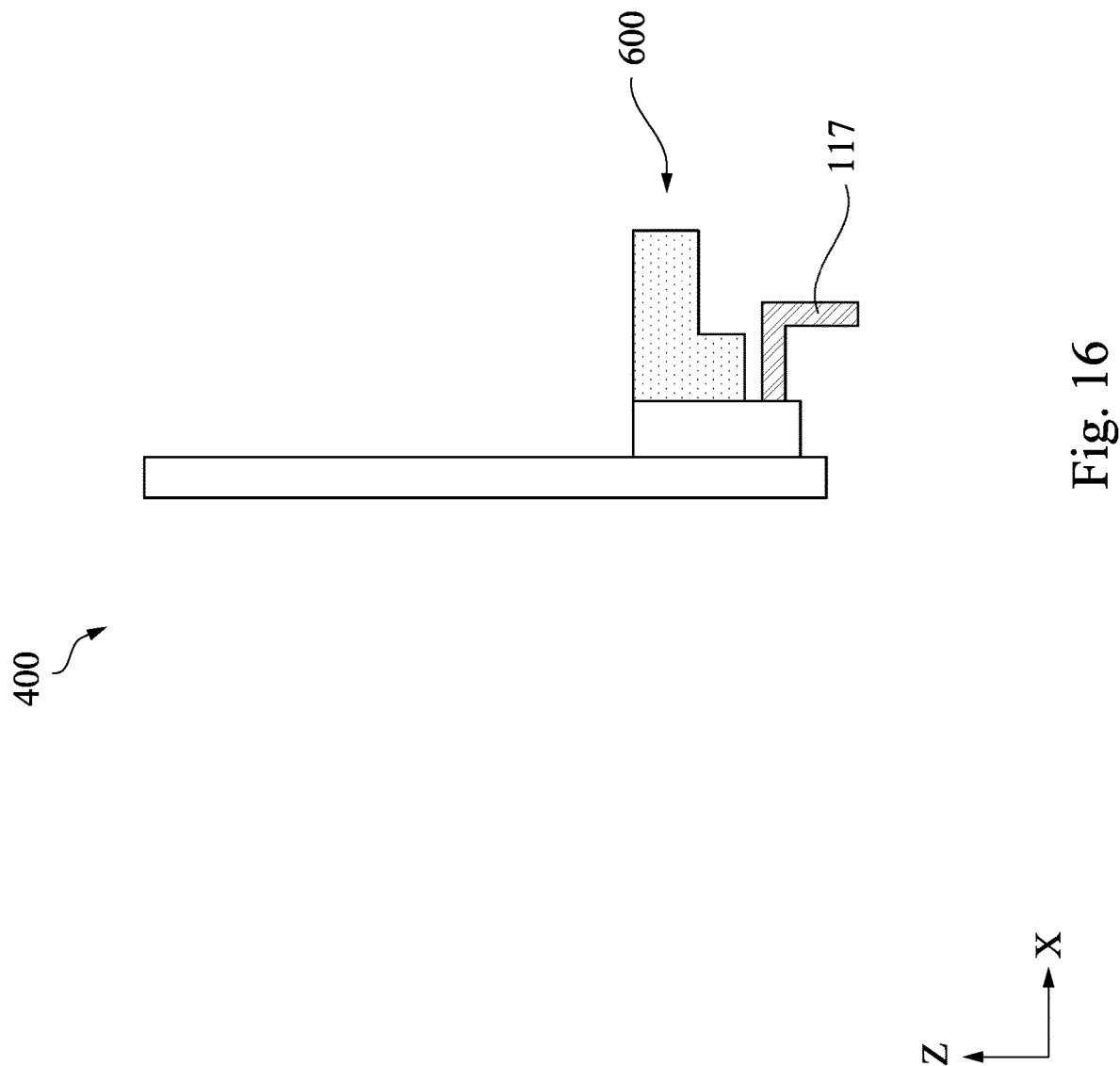
FIG. 16 is a side view of a housing and a cantilever assembled according to some embodiments of the present disclosure.

Reference is made to FIG. 16. FIG. 16 is a side view of the housing 400 and the cantilever 600 assembled according to some embodiments of the present disclosure. As shown in FIG. 16, one end of the cantilever 600 is engaged with the recessed region OP1 (e.g., through the hole H2, the hole H3, the hole H4, and the hole H5), and is, for example, fixed at the hole H2 and the hole H3. The other end of the cantilever 600 can be connected to an in-vehicle device such as a vehicle dashboard through any suitable attachment method.

As shown in FIG. 15 and FIG. 16, the housing 400 further includes a plurality of brackets 117. The brackets 117 are connected to the side of the first fixed end 111, the second fixed end 112, the fifth fixed end 115, and the sixth fixed end 116 away from the first surface 110a to assist in fixing and positioning the display device 20. As shown in FIG. 16, the bracket 117 shown is L-shaped, but the disclosure is not limited thereto.

According to the foregoing recitations of the embodiments of the disclosure, it may be seen that in the display devices of some embodiments of the present disclosure, by disposing a crashworthy structure in the expected impact area, the crashworthy structure is preferentially destroyed when the display device is crushed. As such, the crashworthy structure deforms and absorbs the impact energy, thereby increasing collision time. To be more specific, in the present disclosure, the center point of the display device is assumed to be the expected point of impact. By connecting the center point and the fixed ends two by two, the greatest fan-shaped area included by any two of the connecting lines is obtained. Further, the crashworthy structure is disposed in the greatest area included. For example, crashworthy structures may be disposed through local thinning, perforation, or filling with different materials so that the crashworthy structures deform or buckle during impact testing and thus reduce the head injury criterion number.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A display device, comprising:
a housing having a first surface adjacent to a display panel and comprising a main body, a first fixed end, a second fixed end, a third fixed end, and a fourth fixed end, wherein the first surface has a center point and a bottom side, the center point and the bottom side define a lower half portion of the main body, the first fixed end, the second fixed end, the third fixed end, and the fourth fixed end are disposed in the lower half portion, and the housing further comprises:
an opening area disposed in the lower half portion and having at least one first opening, at least one second opening, and at least one third opening,
wherein the at least one first opening has an axis extending along a first direction substantially perpendicular to the bottom side,
wherein the at least one second opening is disposed on a first side of the at least one first opening and has an axis extending along a second direction having a first angle with respect to the first direction,
wherein the at least one third opening is disposed on a second side of the at least one first opening opposite to the first side and has an axis extending along a third direction having a second angle with respect to the first direction,
wherein the first fixed end and the third fixed end are disposed on the first side, and the second fixed end and the fourth fixed end are disposed on the second side.

2. The display device of claim 1, wherein the axis of the at least one first opening coincides with a central axis of the main body, a vertical distance from the third fixed end to the central axis is greater than a vertical distance from the first fixed end to the central axis, and a vertical distance from the fourth fixed end to the central axis is greater than a vertical distance from the second fixed end to the central axis.

3. The display device of claim 1, wherein the axis of the at least one first opening coincides with a central axis of the main body, a vertical distance from the third fixed end to the central axis is less than a vertical distance from the first fixed end to the central axis, and a vertical distance from the fourth fixed end to the central axis is less than a vertical distance from the second fixed end to the central axis.

4. The display device of claim 1, wherein the first angle and the second angle are between about 30 degrees and about 50 degrees.

5. The display device of claim 1, wherein the housing has a second surface opposite to the first surface, and the at least one first opening, the at least one second opening, and the at least one third opening are recessed from at least one of the first surface and the second surface.

6. The display device of claim 1, wherein a base area of the opening area is a sum of a base area of the at least one first opening, a base area of the at least one second opening, and a base area of the at least one third opening, and a ratio between the base area of the opening area and an area of the main body is between about 5% and about 50%.

7. The display device of claim 1, wherein the at least one first opening, the at least one second opening, and the at least one third opening penetrate the main body.

8. The display device of claim 1, wherein a connecting line between the center point and the third fixed end has a third angle with respect to the first direction, a connecting line between the center point and the fourth fixed end has a fourth angle with respect to the first direction, a connecting line between the center point and the first fixed end has a fifth angle with respect to the first direction, a connecting line between the center point and the second fixed end has a sixth angle with respect to the first direction, wherein the first angle and the second angle are less than or equal to a greatest one among the third angle, the fourth angle, the fifth angle, and the sixth angle.

9. The display device of claim 8, wherein the third angle and the fourth angle are between about 40 degrees and about 50 degrees.

10. The display device of claim 8, wherein the fifth angle and the sixth angle are between about 15 degrees and about 90 degrees.

11. The display device of claim 1, wherein the opening area has a plurality of first openings, a plurality of second openings, and a plurality of third openings, wherein the plurality of first openings is arranged along the first direction, the plurality of second openings is arranged along the second direction, and the plurality of third openings is arranged along the third direction.

12. The display device of claim 1, wherein the at least one first opening is a slot and has a longitudinal axis extending along the first direction, the at least one second opening is a slot and has a longitudinal axis extending along the second direction, and the at least one third opening is a slot and has a longitudinal axis extending along the third direction.

13. The display device of claim 1, wherein the housing further comprises a plurality of cushioning structures filling the at least one first opening, the at least one second opening, and the at least one third opening.

14. The display device of claim 1, wherein the opening area further comprises a plurality of fourth openings extending along a fourth direction, the fourth direction intersects with the first direction and the second direction, and the plurality of fourth openings is disposed in a zone defined by the at least one first opening and the at least one second opening.

15. The display device of claim 1, wherein the opening area further comprises a plurality of fifth openings extending along a fifth direction, the fifth direction intersects with the first direction and the third direction, and the plurality of fifth openings is disposed in a zone defined by the at least one first opening and the at least one third opening.

16. The display device of claim 1, further comprising a cantilever disposed on a second surface of the housing opposite to the first surface and connected to the housing through the third fixed end and the fourth fixed end.

17. A display device, comprising:
a housing having a first surface adjacent to a display panel and comprising a main body, a first fixed end, a second fixed end, a third fixed end, and a fourth fixed end, wherein the first surface has a center point and a bottom side, the center point and the bottom side define a lower half portion of the main body, the first fixed end, the second fixed end, the third fixed end, and the fourth fixed end are disposed in the lower half portion, the first fixed end and the third fixed end are disposed on a first side of the center point, the second fixed end and the fourth fixed end are disposed on a second side of the center point opposite to the first side, and the housing further comprises:
a dished region disposed in the lower half portion and having a first edge and a second edge, wherein the first edge has a first angle with respect to the second edge, and the first angle is between about 80 degrees and about 180 degrees; and
a cushioning structure filling the dished region.

18. The display device of claim 17, wherein the first edge and the second edge intersect at the center point.

19. The display device of claim 17, wherein a connecting line between the center point and the third fixed end have a second angle with respect to a connecting line between the center point and the fourth fixed end, a connecting line between the center point and the first fixed end have a third angle with respect to a connecting line between the center point and the second fixed end, wherein the first angle is less than or equal to a greater one of the second angle and the third angle.

20. The display device of claim 19, wherein the second angle and the third angle are between about 80 degrees and about 180 degrees.

* * * * *